(12) United States Patent
Weber

(10) Patent No.: US 7,770,002 B2
(45) Date of Patent: Aug. 3, 2010

(54) MULTI-FACTOR AUTHENTICATION

(75) Inventor: Frank Weber, Wayne, PA (US)

(73) Assignee: Fiserv, Inc., Brookfield, WI (US)

( * ) Notice: Subject to any disclaimer, the term of this patent is extended or adjusted under 35 U.S.C. 154(b) by 944 days.

(21) Appl. No.: 11/505,510

(22) Filed: Aug. 17, 2006

(65) Prior Publication Data
US 2008/0046723 A1  Feb. 21, 2008

(51) Int. Cl.
H04L 9/32 (2006.01)
(52) U.S. Cl. ............................. 713/159; 713/169
(58) Field of Classification Search ................ 713/159, 713/169, 150; 705/50, 64
See application file for complete search history.

(56) References Cited

U.S. PATENT DOCUMENTS

| | | | | |
|---|---|---|---|---|
| 6,192,382 | B1 | 2/2001 | Lafer et al. ................. | 707/513 |
| 6,401,125 | B1 | 6/2002 | Makarios et al. ............ | 709/229 |
| 6,632,248 | B1 | 10/2003 | Isaac et al. ................ | 715/501.1 |
| 6,691,232 | B1 | 2/2004 | Wood et al. ................. | 713/201 |
| 6,804,786 | B1 | 10/2004 | Chamley et al. ............ | 713/201 |
| 6,957,337 | B1 | 10/2005 | Chainer et al. .............. | 713/186 |
| 7,200,576 | B2 * | 4/2007 | Steeves et al. ................ | 705/64 |
| 2003/0105959 | A1 | 6/2003 | Matyas, Jr. et al. .......... | 713/168 |
| 2003/0126092 | A1 | 7/2003 | Chihara ....................... | 705/67 |
| 2004/0168083 | A1* | 8/2004 | Gasparini et al. ........... | 713/201 |
| 2004/0177276 | A1* | 9/2004 | MacKinnon et al. ........ | 713/201 |
| 2005/0039057 | A1 | 2/2005 | Bagga et al. ................ | 713/202 |
| 2005/0097320 | A1 | 5/2005 | Golan et al. ................ | 713/166 |
| 2005/0177750 | A1 | 8/2005 | Gasparini et al. ........... | 713/201 |
| 2005/0216768 | A1 | 9/2005 | Eppert ........................ | 713/201 |
| 2005/0268100 | A1 | 12/2005 | Gasparini et al. ........... | 713/170 |
| 2005/0268101 | A1 | 12/2005 | Gasparini et al. ........... | 713/176 |
| 2005/0268107 | A1 | 12/2005 | Harris et al. ................. | 713/182 |
| 2006/0015725 | A1 | 1/2006 | Voice et al. ................. | 713/168 |
| 2006/0036868 | A1 | 2/2006 | Cicchitto .................... | 713/182 |
| 2006/0041759 | A1 | 2/2006 | Kaliski, Jr. et al. .......... | 713/184 |

OTHER PUBLICATIONS www.tricipher.com/news/pr079.html; TriCipher Press Release; pp. 1-3; Nov. 8, 2005.
www.cafeid.com/art-sitekey.shtml; PassMark's SiteKey-Answering The Wrong Question; by Trevor Zion Bauknight; pp. 1-3, 2004.
www.computerworld.com/blogs/node/2957; Man-in-the-middle attack against two-factor authentication—Computerworld Blogs; By Martin McKeay on Jul. 12, 2006; pp. 1-6; Jul. 12, 2006.
TriCipher—The TriCipher Armored Credential System (TACS); pp. 1-4; 2006.

* cited by examiner

*Primary Examiner*—Matthew B Smithers
*Assistant Examiner*—Ali S Abyaneh
(74) *Attorney, Agent, or Firm*—Foley & Lardner LLP

(57) ABSTRACT

Methods and devices are provided for two-way authentication. In one example, a method prompts a user for an account number and a PIN. Upon authentication of the account number and the PIN, an e-mail having a link to a new session is sent to the user. If the account number and the PIN were authenticated, a custom background preselected by the user is presented in the new session and a password is requested. Use of the custom background preselected by the user may help the user authenticate the computer system to which he is attempting to gain entry. Upon authentication of the password, entry to a computer system is permitted. To provide optional, enhanced anti-phishing capability, if the account number and the PIN were not authenticated, the an indication may be made that the e-mail message is being sent.

22 Claims, 4 Drawing Sheets

MULTI-FACTOR AUTHENTICATION

BACKGROUND

The present invention relates generally to the field of authentication, and more specifically to the two-way authentication of a user to a computer system and computer system to a user.

The Internet and the World Wide Web allow users to communicate with software operating at various computer systems. Many of these communications are sensitive in nature. Examples of such communications include on-line banking, sending credit card information to purchase a product and the use of virtual private networking thereby providing access to sensitive network content via the Internet. Because of the anonymity provided by the Internet, there is a potential for unauthorized third parties to intercept portions of such communications to be able to obtain financial information (e.g., account numbers, etc.) or access to other sensitive information.

Various attempts to intercept portions can include an unauthorized third party appearing to be a legitimate entity on the Internet, thereby inducing a legitimate user into providing identifying information to an illegitimate site. This is sometimes known as phishing. By obtaining such identifying information, the unauthorized third party may be able to later gain access to the legitimate entity, such as a bank or virtual private networking site, by appearing to be the legitimate user.

Another attempt to intercept communications is often called a man-in-the-middle attack. In such a case, the illegitimate site functions as a go-between between the legitimate user and legitimate site, thereby capturing all information needed to appear to be the legitimate user and later gain entry to the legitimate site while the user in unaware of the communications capture.

Other attempts to intercept portions include keystroke capture in which an ability to record keystrokes of the user can enable an unauthorized third party to later masquerade as the legitimate user by repeating the keystrokes.

A need exists for an authentication approach that can aid a user in distinguishing a legitimate site from an illegitimate site, as well as inhibit unauthorized third parties from masquerading as a legitimate user and easily replicate the authentication steps asked of the user to gain entry to a computer system.

SUMMARY

Various embodiments of the present invention can address some of the deficiencies of authentication schemes presently used in the art. Examples of the present invention may be used in a wide variety of applications to provide authentication between a user and computer system to enable both a computer system to authenticate a user and a user to authenticate the computer system.

Anti-phishing functionality may be provided by the use of a user-selected, custom background, and optionally a user-selected, custom phrase, that are presented to the user after initial, correct entry of identifying information, such as an account number and PIN. The custom background can optionally be used on a plurality, or all, of the screens of the session, even after the authentication process, to increase the user's likelihood of expecting to see the background image before entering additional identifying information, such as a password and/or authentication key.

A non-user-selected custom background can be displayed when a non-authenticated customer number and PIN combination is entered, thereby thwarting an unauthorized third party from using the initial authentication process to obtain information about the user-selected background by trying various account number and PIN combinations. Likewise, an indication that an e-mail is being sent to the user with additional information can be provided whether or not the account number and PIN are correct. According to various embodiments of the invention, only in the case of the authenticated account number and PIN would an e-mail be sent to the user.

Also, various embodiments of the invention may provide a second band in order to provide unique, identifying information that is then promptly used to proceed to a second phase of authentication. In some embodiments, the second band is an e-mail containing a link to a new session, thereby seeking to thwart man-in-the-middle attacks. In other embodiments, the second band is an e-mail providing an authentication key that the user then enters.

According to one illustrative embodiment of the invention, a method prompts a user for an account number and a PIN. Upon authentication of the account number and the PIN, an e-mail having a link to a new session is sent to the user. If the account number and the PIN were authenticated, a custom background preselected by the user is presented in the new session and a password is requested. Use of the custom background preselected by the user may help the user authenticate the computer system to which he is attempting to gain entry. Upon authentication of the password, entry to a computer system is permitted.

In another illustrative embodiment of the invention, a computer-readable medium is provided for use with an electronic device. The medium has instructions that are executable using the electronic device for performing a method of authentication. The method includes prompting a user for an account number and a PIN, and upon authentication of the account number and the PIN, sending an e-mail to the user having a link to a new session. If the account number and the PIN were authenticated, a custom background preselected by the user is displayed in the new session and a password is requested. If the account number and the PIN were not authenticated, an indication is made that a link is being e-mailed to the user. A password is also requested. Upon authentication of the password, entry to a computer system is permitted.

According to a further illustrative embodiment of the invention, a method for two-way authentication is provided. The method includes prompting a user for an account number and a PIN. Upon authentication of the account number and the PIN, an e-mail having a link to a new session is sent to the user. The e-mail is addressed to at least one e-mail account previously associated with the user. If the account number and the PIN were authenticated, a custom background preselected by the user is presented in the new session and requesting a password. Also, if the account number and the PIN were authenticated, when requesting the password in the new session, a custom phrase preselected by the user is presented when requesting the password. If the account number and the PIN were not authenticated, an indication is made that a link is being e-mailed to the user. Upon authentication of the password, entry to a computer system is permitted.

According to another illustrative embodiment of the invention, a method for two-way authentication is provided. The method includes prompting a user for an account number and a PIN. Upon authentication of the account number and the PIN, an e-mail having an authentication key is sent to the user. The authentication key is formed of a plurality of individually randomly generated characters. If the account number and the PIN were authenticated, a custom background preselected by the user is presented. Both a password and authentication key are requested. Upon authentication of the password and the authentication key, entry to a computer system is permitted.

BRIEF DESCRIPTION OF THE DRAWINGS

The invention will be apparent from the description herein and the accompanying drawings.

DETAILED DESCRIPTION

According to various embodiments of the invention, methods and devices are provided for authentication between a user and a computer system. In one example, a user is prompted for an account number and a PIN. Upon authentication of the account number and the PIN, an e-mail having a link to a new session is sent to the user. If the account number and the PIN are authenticated, a custom background preselected by the user is presented in the new session and a password is requested. Use of the custom background preselected by the user may help the user authenticate the computer system to which he is attempting to gain entry. Upon authentication of the password, entry to a computer system is permitted.

According to an example implementation of the invention, when the user first registers with the desired computer system, the user may select custom information to be presented whenever the user returns to the desired computer system. The custom information may be a custom background, including an image, repeating pattern or combination thereof, and/or a custom phrase. The user can then verify that the user is really interacting with the correct computer system by looking for the custom information. If the custom information is not there, then the user knows that this is not the desired computer system. Optionally, the custom information may be displayed on a plurality of screens and/or all the screens that the user sees on the computer system.

Figure 1:
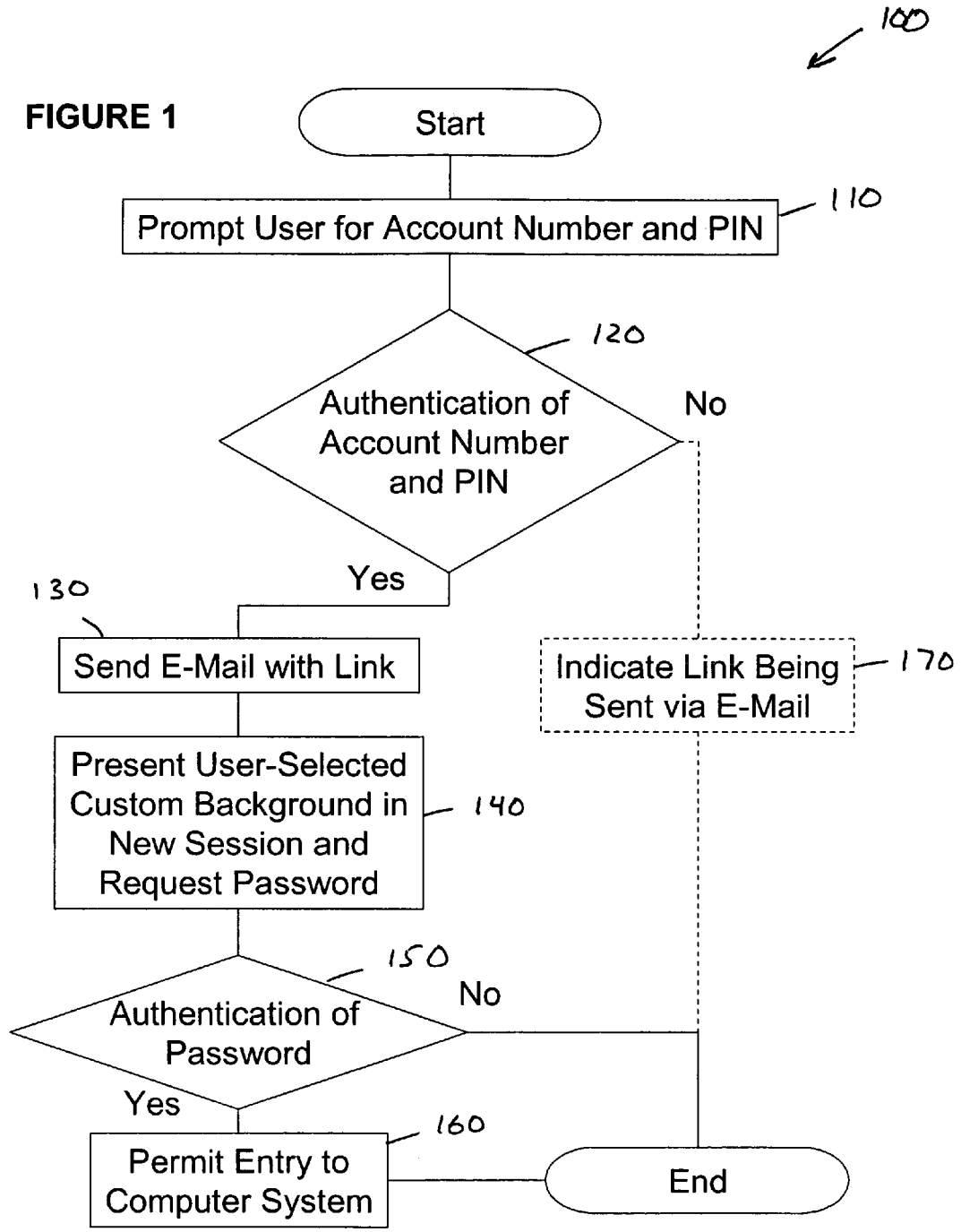
FIG. 1 is an illustration of an example of a method of authentication including sending a link via e-mail according to an illustrative embodiment of the invention.

With reference to FIG. 1, a method according to an embodiment of the invention is illustrated by way of example. The method 100 prompts 110 a user for an account number and a PIN. Upon authentication 120 of the account number and the PIN, an e-mail having a link to a new session is sent 130 to the user. Optionally, the link may be formed of one or more of: an encrypted member number, PIN, date, time and authentication key. It is understood that the link may have a display text for instructing a user, such as, by way of example, "Click here to logon," while the address of the link may be hidden from view of the user in hypertext.

In one example implementation, the link may be to a new session on the same server. The session containing the prompt for the account number and PIN may optionally be automatically closed after the account number and PIN are submitted.

According to the method of FIG. 1, if the account number and the PIN were authenticated, a custom background preselected by the user is presented 140 in the new session and a password is requested. Use of the custom background preselected by the user may help the user authenticate the computer system to which he is attempting to gain entry. The custom background may be presented by display of the custom background and/or the sending of instructions for displaying the custom background. By the use of a new session, the man-in-the-middle attack is thwarted, as the user continues with authentication in a new session that the man-in-the-middle is not participating in.

Upon authentication 150 of the password, entry to a computer system is permitted 160. The present invention may be used with a wide variety of computer systems. In one example, the computer system is a on-line banking system. Entry to such a computer system can permit the user to view account balances and/or transfer funds between accounts, or any of a wide variety of other capabilities apparent to one of ordinary skill in the art.

Optionally, an indication may be provided that an e-mail is being sent to the user. If the account number and PIN are not authenticated 120, an indication 170 may be provided to give the impression that a link is being sent via e-mail to the user. Such an indication may provide an anti-phishing function, as an improperly entered account number and/or PIN will not appear to be incorrect to the unauthorized user entering them, even though in the present example no e-mail is sent. In such a case, a custom background not matching a custom background preselected by the user may optionally be presented with the indication that a link is being sent via e-mail to the user.

The indication that a link is being sent via e-mail to the user may optionally be provided when the account number and PIN are authenticated 120 and the e-mail is being sent. In such a case, a custom background preselected by the user may optionally be presented with the indication that a link is being sent via e-mail to the user.

According to the present example of the invention, the e-mail is addressed to one or more of the e-mail accounts previously associated with the user. E-mail addresses may be previously associated with the user such as by entry at the time of initial registration with the user and the computer system and/or entry by the user during an authenticated session. Optionally, the user can be provided with a choice of which e-mail address of the previously associated addresses the e-mail should be sent to, or the e-mail could be sent to all associated addresses.

In an implementation of the invention, navigation capabilities and manual address capabilities of a typical browser may be omitted in order to prevent the user from navigating away from the desired sites of the computer system and also to prevent bookmaking of various intermediate sites.

In the present example, to provide optional anti-phishing capability, if the account number and the PIN were not authenticated, the custom background may still be presented in the new session, but the custom background does not match a user-preselected custom background. Other features such as presenting a custom phrase as a secondary form by which the user can authenticate the computer system and use of a graphical keypad to avoid the requirement to use keystrokes that could be captured may be used with various embodiments of the invention.

Figure 2:
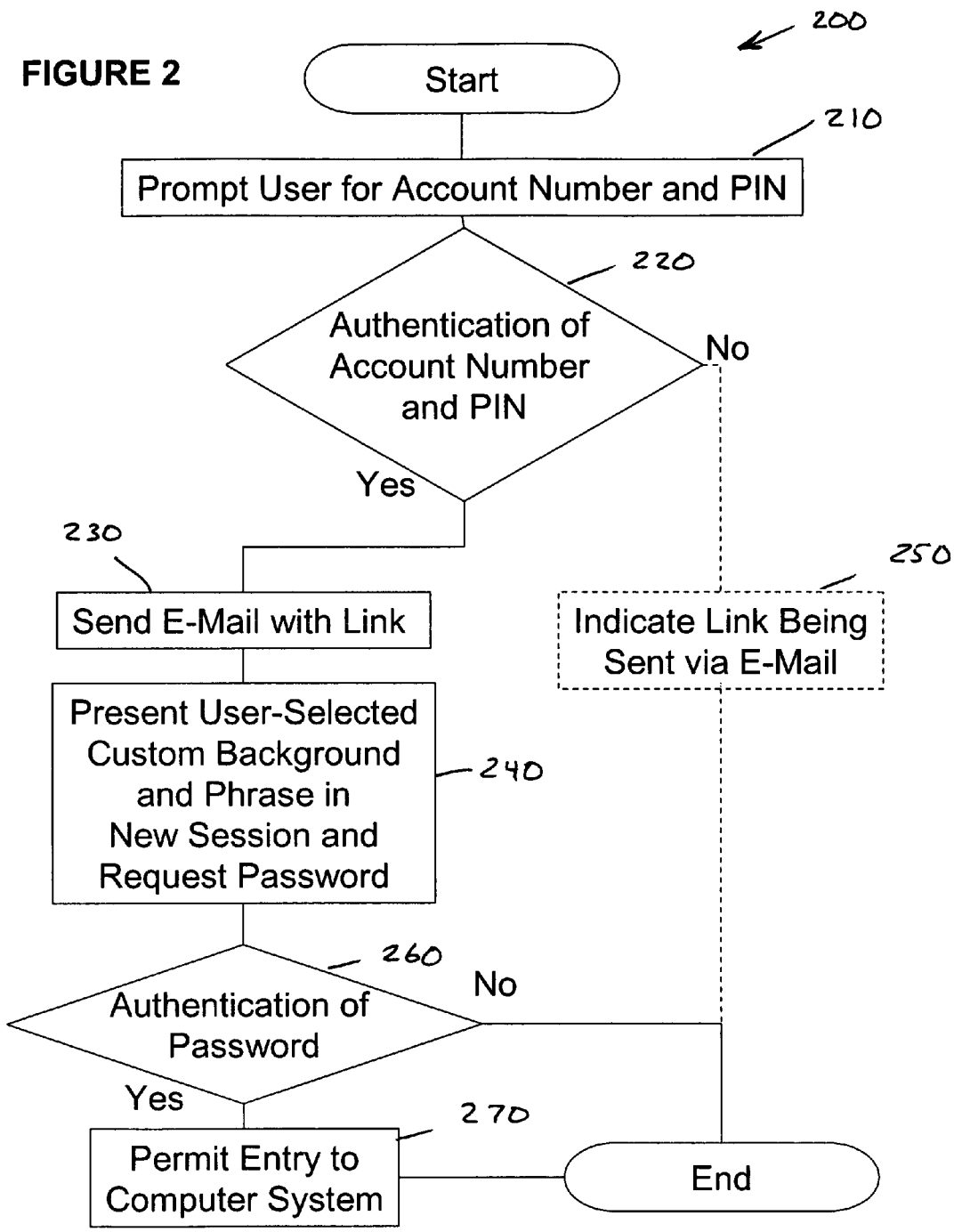
FIG. 2 is an illustration of an example of a method of authentication including sending a link via e-mail according to an illustrative embodiment of the invention.

Another example method 200 is illustrated in FIG. 2. The method 200 includes prompting 210 a user for an account number and a PIN. Upon authentication 220 of the account number and the PIN, an e-mail having a link to a new session is sent 230 to the user. The e-mail may be addressed to at least one e-mail account previously associated with the user. If the account number and the PIN were authenticated, a custom background preselected by the user is presented 240 in the new session and requesting a password. Also, if the account number and the PIN were authenticated, when requesting the password in the new session, a custom phrase preselected by the user is presented 240 when requesting the password. If the account number and the PIN were not authenticated, an indication 250 may be provided to give the impression that a link is being sent via e-mail to the user. Upon authentication 260 of the password, entry to a computer system is permitted 270.

Figure 3:
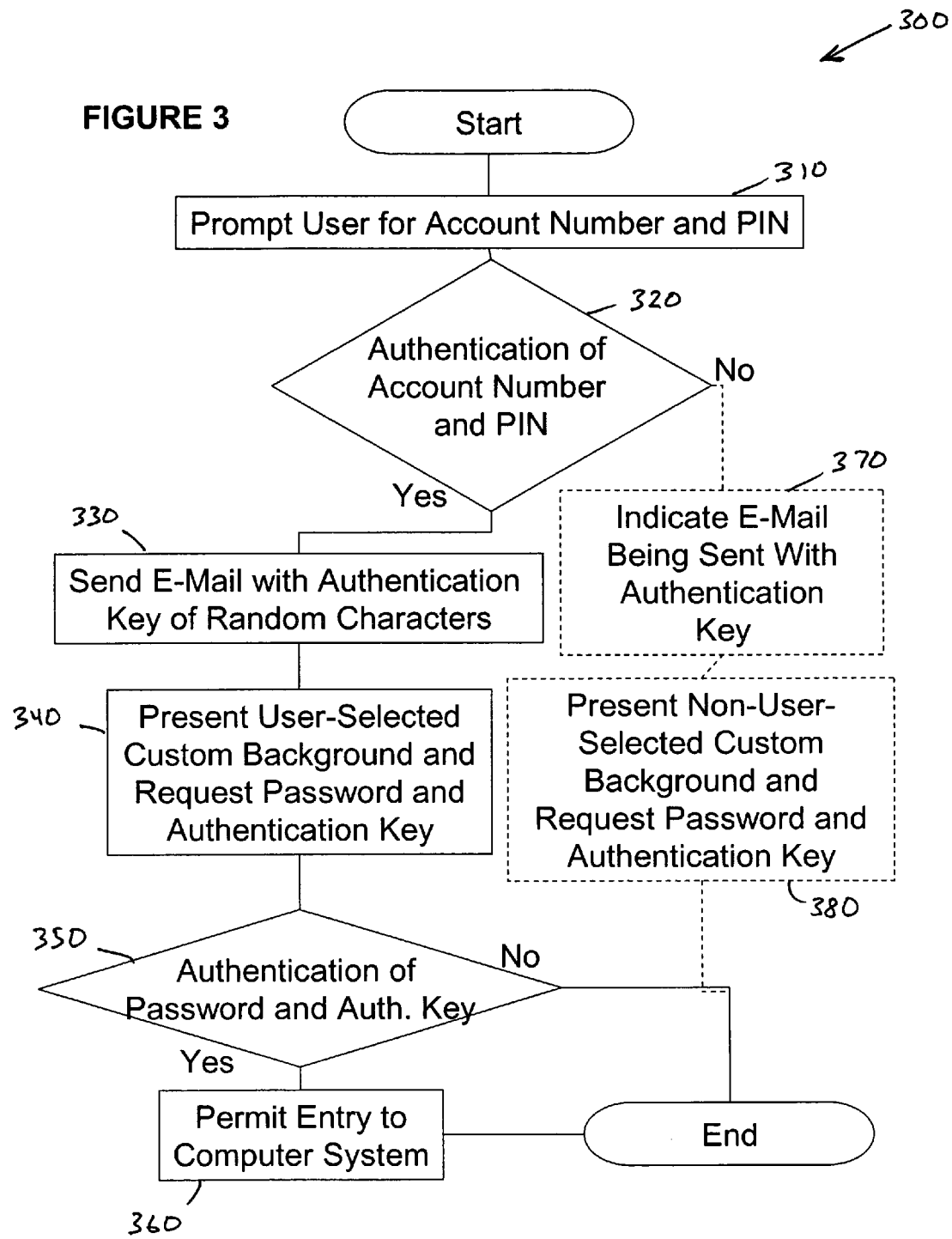
FIG. 3 is an illustration of an example of a method of authentication including sending an authentication key via e-mail according to an illustrative embodiment of the invention.

According to another illustrative embodiment of the invention, a method 300 for two-way authentication is provided. See FIG. 3. The method includes prompting 310 a user for an account number and a PIN. Upon authentication 320 of the account number and the PIN, an e-mail having an authentication key is sent 330 to the user. In the present example, the authentication key may be formed of a plurality of one-time, individually randomly generated characters. If the account number and the PIN were authenticated, a custom background preselected by the user is presented 340. Both a password and authentication key are requested 340. Upon authentication 350 of the password and the authentication key, entry to a computer system is permitted 360. Optionally, in the event that the account number and PIN are not authenticated 320, an indication 370 may be provided to give the impression that the authentication key is being sent via e-mail to the user. Also optionally, if the account number and the PIN were not authenticated 320, a custom background not matching a user-preselected custom background is presented 380 and a password and authentication key are requested 380. The use of a custom background not matching a user-preselected custom background may provide an anti-phishing functionality, as a non-authorized user does not realize that the account number and PIN were not authenticated and any attempt to replicate the site will result in a custom background that the user is not expecting, ideally causing the user to not enter the password and authentication key to any false site. Optionally, if the account number and the PIN were not authenticated, when requesting the password in the new session, a custom phrase not matching a user-preselected custom phrase is presented when requesting the password.

A graphical keypad may be presented to enable the user to enter one or more of the account number, PIN, password or authentication key. Optionally, the ability of the user to use the keypad may be disabled when the graphical keypad is displayed. By the use of the graphical keypad, traditional keystroke capture attempts may be thwarted, as keystrokes are not entered, but values passed to the computer system are a mapping of digital screen points linked to the location of the keys of the graphical keypad, with the inherent randomness of the pointer's location being somewhere on each key when the mouse is clicked. Optionally, the location of the graphical keypad on the display may be randomly positioned.

Various implementations of the present invention may optionally be used with joint accounts in which multiple users are participating in an account. A wide variety of permissions and privileges of the various joint account members will be apparent to one of ordinary skill in the art. The custom information and identifying information may be individual to the joint account members and/or be shared among members of the same account, as desired.

Figure 4:
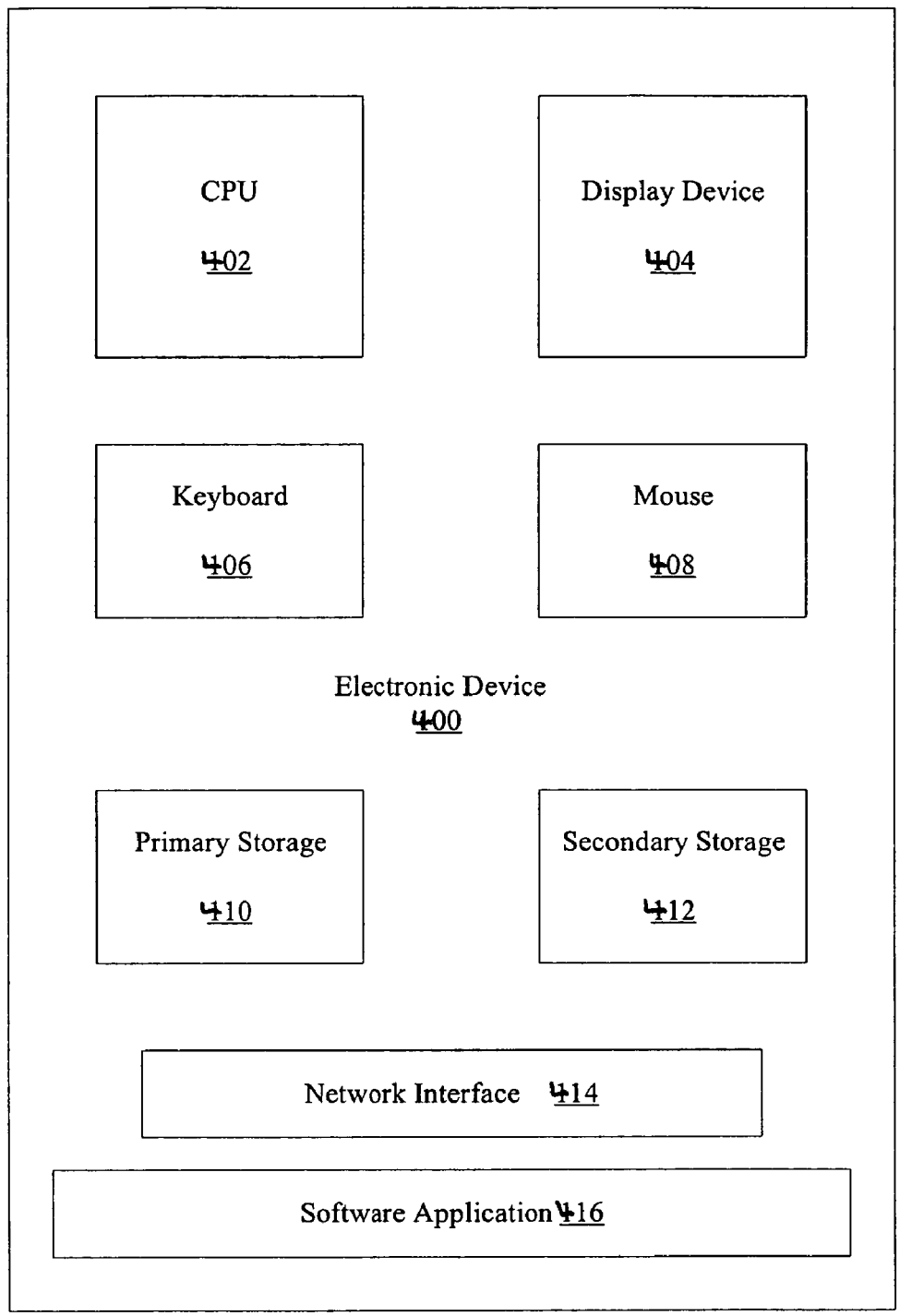
FIG. 4 is an illustration of an example of an electronic device for use with a method according to an illustrative embodiment of the invention.

Various embodiments of the present invention can be implemented by the use of an electronic device, or in a network connecting multiple electronic devices. The electronic device may be a part of the desired computer system to which the user desires to gain entry or may communicate with one or more desired computer systems. FIG. 4 illustrates one example embodiment of an electronic device 400 suitable for practicing the illustrative embodiments of the present invention. The electronic device 400 is representative of a number of different technologies, such as personal computers (PCs), laptop computers, workstations, personal digital assistants (PDAs), Internet appliances, routers, switches, cellular telephones, wireless devices, and the like. In the illustrated embodiment, the electronic device 400 includes a central processing unit (CPU) 402 and a display device 404. The display device 404 enables the electronic device 400 to communicate directly with a user through a visual display.

The electronic device 400 further includes a keyboard 406 and a mouse 408. Other potential input devices not depicted include a stylus, trackball, joystick, touch pad, touch screen, and the like. The electronic device 400 includes primary storage device 410 and secondary storage device 412 for storing data and instructions. The primary and secondary storage devices 410 and 412 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 410 and 412.

The electronic device 400 can also include a network interface 414 for communicating with one or more electronic devices external to the electronic device 400 depicted. Modems and Ethernet cards, are examples of network interfaces 414 for establishing a connection with an external electronic device or network. The CPU 402 has either internally, or externally, attached thereto one or more of the aforementioned components. Interactive programming and/or development applications 416, and other applications can be installed and operated on the electronic device 400.

It should be noted that the electronic device 400 is merely representative of a structure for implementing portions of the present invention. However, one of ordinary skill in the art will appreciate that the present invention is not limited to implementation on only the described electronic device 400. Other implementations can be utilized, including an implementation based partially or entirely in embedded code, where no user inputs or display devices are necessary. In such an instance, a processor can communicate directly with another processor, or other device.

In another illustrative embodiment of the invention, a computer-readable medium is provided for use with an electronic device 400. The medium has instructions that are executable using the electronic device 400 for performing a method of authentication. While a wide variety of methods are within the scope of the invention, in the present example, the method includes prompting a user for an account number and a PIN, and upon authentication of the account number and the PIN, sending an e-mail to the user having a link to a new session. If the account number and the PIN were authenticated, a custom background preselected by the user is displayed in the new session and a password is requested. If the account number and the PIN were not authenticated, a custom background that does not match a user-preselected custom background is displayed in the new session. A password is also requested. Upon authentication of the password, entry to a computer system is permitted.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way.

What is claimed is:

1. A non-transitory computer-readable medium having stored therein a set of instructions that when executed by one or more computer systems cause the one or more computer systems to implement a method, comprising:

prompting a user for a first account identifier and a second account identifier in a first session between the user and at least one of the one or more computer systems;

authenticating the first account identifier and the second account identifier received in response to prompting;

responsive to authenticating the first account identifier and the second account identifier, sending an e-mail to the user having a link to a second session between the user and at least one of the one or more computer systems, wherein the second session is activated by the user activating the link;

presenting a first custom background in the second session and requesting a password, the first custom background having been preselected by the user;

upon authentication of the password received in response to the requesting, permitting entry to a computer system; and upon failure to authenticate the first account identifier and the second account identifier, presenting in the first session a second custom background not preselected by the user while indicating in the first session that the link is being e-mailed to the user.

2. The non-transitory computer-readable medium of claim 1, wherein the instructions further cause the one or more computer systems, upon authentication of the first account identifier and the second account identifier, to present the first custom background in the first session while indicating in the first session that the link is being e-mailed to the user.

3. The non-transitory computer-readable medium of claim 1, wherein sending the e-mail to the user comprises sending the e-mail to at least one e-mail account previously associated with the user.

4. The non-transitory computer-readable medium of claim 1, wherein prompting the user for the first account identifier and the second account identifier comprises presenting a graphical keypad and disabling direct keyboard entry of at least one of the first account identifier and the second account identifier.

5. The non-transitory computer-readable medium of claim 1, wherein presenting the first custom background and requesting the password comprises presenting a graphical keypad and disabling direct keyboard entry of the password.

6. The non-transitory computer-readable medium of claim 5, wherein presenting the first custom background and requesting the password comprises randomly positioning the graphical keypad on the display.

7. The non-transitory computer-readable medium of claim 1, wherein the link contains an encrypted authentication key associated with the user.

8. The non-transitory computer-readable medium of claim 1, wherein the link is time-coded.

9. The non-transitory computer-readable medium of claim 1, wherein the instructions further cause the one or more computer systems to automatically close the first session.

10. The non-transitory computer-readable medium of claim 1, wherein the instructions further cause the one or more computer systems, responsive to authenticating the first account identifier and the second account identifier, to present a custom phrase in the second session when requesting the password, the custom phrase having been preselected by the user.

11. The non-transitory computer-readable medium of claim 1, wherein the entry is to an on-line banking computer system.

12. The non-transitory computer-readable medium of claim 1, wherein the instructions further cause the one or more computer systems, responsive to permitting entry, to permit the user to view account balances.

13. The non-transitory computer-readable medium of claim 1, wherein the instructions further cause the one or more computer systems, responsive to permitting entry, to permit the user to instruct the computer system to transfer funds between accounts.

14. The non-transitory computer-readable medium of claim 1, wherein the instructions further cause the one or more computer systems, responsive to permitting entry to the computer system, to provide the first custom background on a plurality of screens presented to the user of the computer system.

15. The non-transitory computer-readable medium of claim 1, wherein the instructions further cause the one or more computer systems to omit navigation capabilities and manual address entry capability for the user in the first session and the second session.

16. The non-transitory computer-readable medium of claim 1, wherein the first identifier is an account number.

17. The non-transitory computer-readable medium of claim 1, wherein the second identifier is a PIN.

18. A non-transitory computer-readable medium having stored therein a set of instructions that when executed by one or more computer systems cause the one or more computer systems to implement a method, comprising:

prompting a user for a first account identifier and a second account identifier in a first session between the user and at least one of the one or more computer systems;

authenticating the first account identifier and the second account identifier;

responsive to authenticating the first account identifier and the second account identifier, sending an e-mail to the user having a link to a second session between the user and at least one of the one or more computer systems, wherein the second session is activated by the user activating the link, an authentication key, the authentication key formed of a plurality of individually randomly generated characters;

presenting a first custom background and requesting a password and the authentication key in the second session, the first custom background having been preselected by the user; and upon authentication of the password and the authentication key received in response to the requesting, permitting entry to a computer system; and upon failure to authenticate the first account identifier and the second account identifier, presenting a second custom background and requesting the password, the second custom background not matching the first custom background.

19. The non-transitory computer-readable medium of claim 18, wherein the instructions further cause the one or more computer systems, upon failure to authenticate the first account identifier and the second account identifier, to present in the second session a custom phrase when requesting the password, the custom phrase not matching a user-preselected custom phrase.

20. The non-transitory computer-readable medium of claim 18, wherein the instructions further cause the one or more computer systems, responsive to permitting entry, to permit the user to instruct the computer system to transfer funds between accounts.

21. The non-transitory computer-readable medium of claim 18, wherein the first identifier is an account number.

22. The non-transitory computer-readable medium of claim 18, wherein the second identifier is a PIN.

* * * * *